(12) United States Patent  
Banu

(10) Patent No.: US 10,763,940 B2
(45) Date of Patent: Sep. 1, 2020

(54) DIGITAL PORT EXPANSION FOR HYBRID MASSIVE MIMO SYSTEMS

(71) Applicant: Blue Danube Systems, Inc., Warren, NJ (US)

(72) Inventor: Mihai Banu, New Providence, NJ (US)

(73) Assignee: Blue Danube Systems, Inc., Warren, NJ (US)

( * ) Notice: Subject to any disclaimer, the term of this patent is extended or adjusted under 35 U.S.C. 154(b) by 0 days.

(21) Appl. No.: 16/353,325

(22) Filed: Mar. 14, 2019

(65) Prior Publication Data

US 2019/0288762 A1    Sep. 19, 2019

Related U.S. Application Data

(60) Provisional application No. 62/643,899, filed on Mar. 16, 2018.

(51) Int. Cl.
| | |
|---|---|
| H04B 7/06 | (2006.01) |
| H04W 88/08 | (2009.01) |
| H04B 7/0408 | (2017.01) |
| H04B 7/08 | (2006.01) |

(52) U.S. Cl.
CPC ......... H04B 7/0686 (2013.01); H04B 7/0408 (2013.01); H04B 7/0617 (2013.01); H04B 7/0842 (2013.01); H04W 88/085 (2013.01)

(58) Field of Classification Search
None
See application file for complete search history.

(56) References Cited

U.S. PATENT DOCUMENTS

| | | | |
|---|---|---|---|
| 2003/0032424 A1* | 2/2003 | Judd | H04W 16/28 455/426.1 |
| 2014/0177607 A1* | 6/2014 | Li | H04W 52/42 370/336 |
| 2015/0124688 A1 | 5/2015 | Xu et al. | |
| 2019/0028153 A1* | 1/2019 | Suyama | H01Q 3/2652 |
| 2019/0199410 A1* | 6/2019 | Zhao | H04B 7/0456 |
| 2019/0372631 A1* | 12/2019 | Taira | H04B 7/043 |

FOREIGN PATENT DOCUMENTS

WO    2017/195183 A1    11/2017

* cited by examiner

*Primary Examiner* — Rebecca E Song
(74) *Attorney, Agent, or Firm* — Occhiuti & Rohlicek LLP

(57) ABSTRACT

A signal transmission method involving: receiving M·N digital transmit signal streams, each of which represents a transmit signal for a different corresponding antenna element of an M×N array of antenna elements; generating P digital transmit-beam signal streams from the M·N digital transmit signal streams, wherein each of the P digital transmit-beam signal streams is a corresponding linear combination of the M·N digital transmit signal streams; within an R×T Hybrid Massive MIMO system having R·T antenna elements, by applying appropriate phase shifts in an analog domain, causing the R×T Hybrid Massive MIMO system to simultaneously generate a set of P independent, differently directed transmit beams; and mapping each of the P digital transmit beam signal streams to a corresponding different one of the P independent, differently directed transmit beams, wherein M, N, P, R and T are integers, wherein R·T≥M·N, and wherein P<M·N.

30 Claims, 8 Drawing Sheets

DIGITAL PORT EXPANSION FOR HYBRID MASSIVE MIMO SYSTEMS

CROSS-REFERENCE TO RELATED APPLICATION

This application claims the benefit of U.S. Provisional Application No. 62/643,899, filed Mar. 16, 2018, all of which is incorporated herein by reference.

TECHNICAL FIELD

Embodiments described herein generally relate to Massive MIMO systems and more specifically to Hybrid Massive MIMO systems.

BACKGROUND

Conventional Multiple Input Multiple Output or MIMO wireless systems exploit the use of multiple antennas to improve the wireless transmission performance such as boosting capacity, spectrum efficiency, throughput, range, or other key performance indicators. Typically, conventional MIMO systems use a small number of antennas such as less than 10. If the number of antennas is large, such as 32 or more, the MIMO system is usually called Massive MIMO. The antennas of typical Massive MIMO systems are placed in planar arrays of various sizes such as 4×8, 8×8, 4×12, etc. The actual size of an array is called the aperture of the antenna system.

Multiple antennas have the capability of producing transmit/receive diversity, i.e. producing transmit/receive antenna signals, which are mutually independent. This diversity is the necessary and essential ingredient of MIMO systems. It is important to emphasize that in general not all ensembles of multiple antennas chosen arbitrarily provide diversity. A multiple antenna system must be constructed in special ways to provide diversity. Antenna systems providing partial diversity, i.e. providing signals that are only partially independent, are also possible. The number of antennas and the number of independent antenna signals obtained, known as "order of diversity," are not necessarily the same. The order of diversity cannot be larger than the number of antennas, but the number of antennas can be much larger than the order of diversity obtained. In general, for MIMO systems, the larger the order of diversity the better and the more potential benefits to the wireless communication system. The order of diversity is sometimes also referred to as "degrees of freedom" for the wireless communication system.

Multiple antennas usually provide two types of diversity: polarization diversity and spatial diversity. The polarization diversity is typically achieved by using two identical antennas, which are physically rotated by 90 degrees from each other around the axis pointing on the direction of maximum transmitted or received RF energy. In practice, only two antennas with orthogonal polarizations can be realized, i.e., polarizations producing independent antenna signals (100% diversity), because any rotation other than 90 degrees generates coupling between the two antennas. Therefore, a MIMO system using only polarization diversity cannot have diversity of order larger than two. The original 4G LTE cellular system was deployed with two antennas providing only polarization diversity.

Spatial diversity may be obtained by placing antennas far enough from each other, a necessary but not sufficient condition. In practice, achieving good spatial diversity with multiple antennas is more problematic than achieving polarization diversity because spatial diversity is not only a function of the antenna system construction and physical placing but also of the scattering environment in which the antennas transmit/receive signals. For example, in an environment without any scattering (e.g., free space), there is no spatial diversity no matter how many antennas are used, how far they are placed from each other, or how they are constructed. This is because all signals transmitted/received in an environment without scattering are 100% correlated.

The main object of MIMO is to capitalize on the diversity of the system to transmit and receive in parallel multiple independent signals over the same frequency bands. This spectrum reuse operation is known as spatial multiplexing and it is the most important method for increasing the capacity of the wireless communication systems. The parallel independent signals transmitted are also called "layers". The 2×2 MIMO (two antennas at the transmitting node and two antennas at the receiving node) with polarization diversity at each node, originally deployed in 4G LTE, supports two layers doubling the maximum data rate of the similar single antenna system also known as Single Input Single Output of SISO (single antenna at the transmitting node and a single antenna at the receiving node). This is because the 2×2 MIMO system has the order of diversity two while SISO has the order of diversity one. A 4×4 MIMO (four antennas at the transmitting node and four antennas at the receiving node) has the theoretical potential of quadrupling the maximum data rate of a similar SISO system. However, in practice the data rate increase in most situations is less than four times that of SISO because the order of diversity of the system is less than four, despite the use of four antennas. As explained earlier, the culprit is the lack of sufficient spatial diversity due to either two little antenna separation or lack of enough scattering or both. As the number of antennas is increased, the practical gains in the system order of diversity get smaller and smaller. It is not uncommon for a Massive MIMO system with 64 antennas or more to have an order of diversity less than ten.

Regarding the design of MIMO systems, an important practical matter is finding the optimum system architecture that fully exploits the order of diversity of the system while minimizing the system complexity. In the case of regular MIMO (e.g. 10 or fewer antennas) the "one full radio per antenna" architecture also known as "Digital" MIMO is the appropriate architecture. While not always strictly optimum (e.g. for 8×8 MIMO the average number of layers is less than 8), this architecture is still reasonable in complexity with only 2-8 radios and provides a system supporting many layers. The case of Massive MIMO systems is different and is discussed next.

A popular Massive-MIMO architecture called Digital Massive MIMO is based on the brute-force scaling of the "one full radio per antenna" architecture of regular MIMO. Therefore, for 32 antennas there are 32 radios with 32 analog-to-digital converters (ADCs) and 32 digital-to-analog converters (DACs), for 64 antennas there are 64 radios with 64 ADCs and 64 DACs, and so on. This architecture is straightforward and quite flexible in terms of digital signal processing possibilities because the MIMO digital processor is connected directly to every antenna element. Traditionally this has been viewed as a major benefit because all MIMO processing such as spatial multiplexing (explained earlier), beamforming (focusing the RF energy towards some users), nulling (removing the RF energy towards other users), etc. are done in the digital domain under software control. More specifically, all phase and magnitude settings of the antenna signals, which determine the radiation patterns of the system are done in software. The analog radios are just "dumb pipes" carrying the signals between the MIMO digital processor and the antennas. In addition, this architecture allows for the processing of orthogonal pilot signals for each antenna, i.e., pilot signals that are mutually independent and can be detected separately. These pilot signals are useful for estimating the channel characteristics between the communication points and are employed commonly in standard communication protocols. Yet another benefit of the Digital MIMO is that independent MIMO processing can be done per frequency sub-bands. For example, in 4G LTE, during a time interval called "sub-frame", multiple users occupying different frequency sub-bands can be processed independently, allowing beamforming in different directions for each respective user. This is called "per-user beamforming".

As mentioned earlier, in most practical cases and for fundamental reasons, the number of layers supported by any Massive MIMO system including the Digital Massive MIMO is far less than the number of antennas used. Since the digital Massive MIMO has as many full radios as there are antennas, there is an inherent and severe inefficiency in these systems in terms of necessary hardware resources, cost, and power dissipation. This will become apparent after the embodiments are described below.

While previously we mentioned only the large number of data converters necessary in Digital Massive MIMO systems, which are expensive and power-hungry components, other such components (expensive and power-hungry) are also necessary. These include high precision analog channel filters (one per each transmitter and one per each receiver), high quality RF frequency synthesizers (one per radio) and high-speed low-jitter digital circuits (custom ICs or FPGAs) for digital signal transport, splitting and aggregation. These components have not been subject to the usual dramatic cost/power Moore's Law improvements, typically experienced in the past for regular digital integrated circuits. Furthermore, Moore's Law itself has already reached the end of its life even for regular digital integrated circuits.

The radios in the Massive MIMO system use many other components, which in terms of cost and power dissipation have benefited in the past from both Moor's Law and from huge production volumes in consumer electronics including mobile phones. These components implement classical transceiver functions such as mixers, intermediate frequency (IF) variable-gain amplifiers (VGAs), RF amplifiers and support biasing and power circuits. Typically, these components are integrated into low-cost, low-power ICs. This is an important capability, which is exploited by embodiments described herein.

Another possible Massive-MIMO architecture is Hybrid Massive MIMO. In this architecture, the number of ADCs and DACs and the other high-cost, high-power components mentioned before is far less than the number of antennas. Since there are not enough digital paths to control the phases and magnitudes of all antenna elements by software, the Hybrid Massive MIMO system adds analog phase shifters and gain blocks for amplitude control behind each antenna element. These additional components are usually controlled by digital means and are in the category of low-cost, low-power components mentioned earlier.

In a Hybrid Massive MIMO system, the radiation patterns are produced partially in the digital domain through phase/magnitude setting of the digital signals flowing through the data converters and partially in the analog domain through the phase/magnitude settings of the analog phase shifters and gain blocks, hence the name "hybrid".

By construction, the Hybrid Massive MIMO system is significantly more efficient than the Digital Massive MIMO system in terms of hardware, cost and power dissipation. However, the Hybrid Massive MIMO system has been regarded as inferior to Digital Massive MIMO due to limited number of digital connections to the MIMO digital processor. Furthermore, the ability of Hybrid Massive-MIMO to provide independent pilots for each antenna element and perform per-user beamforming have also been put in doubt.

SUMMARY

In the following, we show that if a Hybrid Massive MIMO system is designed and operated properly, it can emulate with high precision the operation of a digital Massive MIMO system of the same antenna aperture. In other words, by applying the principles of described herein, an appropriate Hybrid Massive MIMO system can perform all operations a Digital Massive MIMO system performs, including pilot generation and processing for all antennas and per-user beamforming.

We disclose herein new methods for enhancing a Hybrid Massive-MIMO system with certain digital-port expansion blocks and for operating the enhanced system such as to emulate a digital Massive MIMO system. For clarity and simplicity, the embodiments presented below are described using systems with 8×8 antenna arrays but these methods can be applied to systems with any array size, as it will become obvious to those familiar to Massive-MIMO systems.

In general, in one aspect, at least one of the inventions features a signal transmission method involving: receiving from a base band unit M·N (where M·N means M multiplied by N) digital transmit signal streams, each digital transmit signal stream representing a transmit signal for a different corresponding antenna element of an M×N (a.k.a. M by N) array of antenna elements; generating P digital transmit-beam signal streams from the M·N digital transmit signal streams, wherein each of the P digital transmit-beam signal streams is a corresponding linear combination of the M·N digital transmit signal streams; within an R×T Hybrid Massive MIMO system having R·T antenna elements, by applying appropriate phase shifts in an analog domain, causing the R×T Hybrid Massive MIMO system to simultaneously generate a set of P independent, differently directed transmit beams; and within the R×T Hybrid Massive MIMO system, mapping each of the P digital transmit beam signal streams to a corresponding different one of the P independent, differently directed transmit beams of the set of P independent, differently directed transmit beams, wherein M, N, P, R and T are integers, wherein R·T ≥ M·N, and wherein P<M·N.

Other embodiments include one or more of the following features. In the signal transmission method R·T=M·N and P is much less than M·N (e.g. R=T=M=N=P=8). Each of the P digital transmit-beam signal streams is a corresponding different linear combination of the M·N digital transmit signal streams, more specifically, a corresponding different linear combination of all of the M·N digital transmit signal streams. The P independent, differently directed transmit beams of the set of P independent, differently directed transmit beams are narrow beams. The R×T Hybrid Massive MIMO system has a field of view and the P independent, differently directed transmit beams of the set of P independent, differently directed transmit beams are arranged to form a full aperture covering set for the field of view. The linear combinations used to form the P digital transmit-beam signal streams are defined so as to cause the antenna system to operate as a Digital Massive MIMO system. All of the R·T antenna elements of the R×T Hybrid Massive MIMO system are used to generate each of the P independent, differently directed transmit beams of the set of P independent, differently directed transmit beams.

In general, in another aspect, at least one of the inventions features a signal receiving method involving: within an R×T Hybrid Massive MIMO system having R·T antenna elements, by applying appropriate phase shifts in the analog domain, causing the R×T Hybrid Massive MIMO system to simultaneously generate a set of P independent, differently directed receive beams; simultaneously receiving P received beam signal streams, each received beam signal stream of the P received beam signal streams received over a different corresponding one of the P independent, differently directed receive beams of the set of P independent, differently directed receive beams; generating M·N digital, up-converted signal streams from the P received beam signal streams, wherein each of the M·N digital, up-converted signal streams is a corresponding different linear combination of the P received beam signal streams; and sending the M·N digital, up-converted signal streams to a base band unit, wherein M, N, P, R and T are integers, wherein R·T ≧ M·N, and wherein P<M·N.

Other embodiments include one or more of the following features. In the signal receiving method R·T=M·N and P is much less than M·N (e.g. R=T=M=N=P=8). Each of the M·N digital up-converted transmit signal streams is a corresponding different linear combination of the P received beam signal streams, more specifically, a corresponding different linear combination of all of the P received beam signal streams. The P independent, differently directed receive beams of the set of P independent, differently directed receive beams are narrow beams. The R×T Hybrid Massive MIMO system has a field of view and wherein the P independent, differently directed receive beams of the set of P independent, differently directed receive beams are arranged to form a full aperture covering set for the field of view. The linear combinations used to form the M·N digital, up-converted signal streams are defined so as to cause the antenna system to operate as a Digital Massive MIMO system. All of the R·T antenna elements of the R×T Hybrid Massive MIMO system are used to generate each of the P independent, differently directed receive beams of the set of P independent, differently receive transmit beams.

In general, in yet another aspect, at least one of the inventions features an antenna system including: a down converter module having M·N inputs for receiving M·N digital transmit signal streams, each digital transmit signal stream representing a transmit signal for a different corresponding antenna element of an M×N array of antenna elements, said down converter module programmed to generate P digital transmit-beam signal streams from the M·N digital transmit signal streams, wherein each of the P digital transmit-beam signal streams is a corresponding linear combination of the M·N digital transmit signal streams; and an R×T Hybrid Massive MIMO system having R·T antenna elements, said R×T Hybrid Massive MIMO system configured to apply appropriate phase shifts in an analog domain that cause the R×T Hybrid Massive MIMO system to simultaneously generate a set of P independent, differently directed transmit beams and further configured to map each of the P digital transmit beam signal streams to a corresponding different one of the P independent, differently directed transmit beams of the set of P independent, differently directed transmit beams, wherein M, N, P, R and T are integers, wherein R·T ≧ M·N, and wherein P<M·N.

Other embodiments include one or more of the following features. Each of the P digital transmit-beam signal streams is a corresponding different linear combination of all of the M·N digital transmit signal streams. The R×T Hybrid Massive MIMO system has a field of view and wherein the P independent, differently directed transmit beams of the set of P independent, differently directed transmit beams are arranged to form a full aperture covering set for the field of view. The linear combinations used to form the P digital transmit-beam signal streams are defined so as to cause the antenna system to operate as a Digital Massive MIMO system.

In general, in still yet another aspect, at least one of the inventions features an antenna system including: an R×T Hybrid Massive MIMO system having R·T antenna elements, said R×T Hybrid Massive MIMO system configured to apply appropriate phase shifts in the analog domain that cause the R×T Hybrid Massive MIMO system to simultaneously generate P independent, differently directed receive beams for receiving P received beam signal streams, each received beam signal stream of the P received beam signal streams received over a different corresponding one of the P differently directed receive beams; an up-converter module having P inputs for receiving the P received beam signal streams from the R×T Hybrid Massive MIMO system, said up-converter module programmed to generate M·N digital, up-converted signal streams from the P received beam signal streams, wherein each of the M·N digital up-converted signal streams is a corresponding different linear combination of the P received beam signal streams and output the M·N digital up-converted signal streams for a base band unit, wherein M, N, P, R and T are integers, wherein R·T ≧ M·N, and wherein P<M·N.

Other embodiments include one or more of the following features. Each of the M·N digital up-converted transmit signal streams is a corresponding different linear combination of all of the P received beam signal streams. The R×T Hybrid Massive MIMO system has a field of view and wherein the P independent, differently directed receive beams of the set of P independent, differently directed receive beams are arranged to form a full aperture covering set for the field of view. The linear combinations used to form the M·N digital, up-converted signal streams are defined so as to cause the antenna system to operate as a Digital Massive MIMO system.

BRIEF DESCRIPTION OF THE DRAWINGS

In the preceding figures, like elements and like components may be identified with like reference numbers.

DETAILED DESCRIPTION

Digital Massive MIMO System

Figure 1:
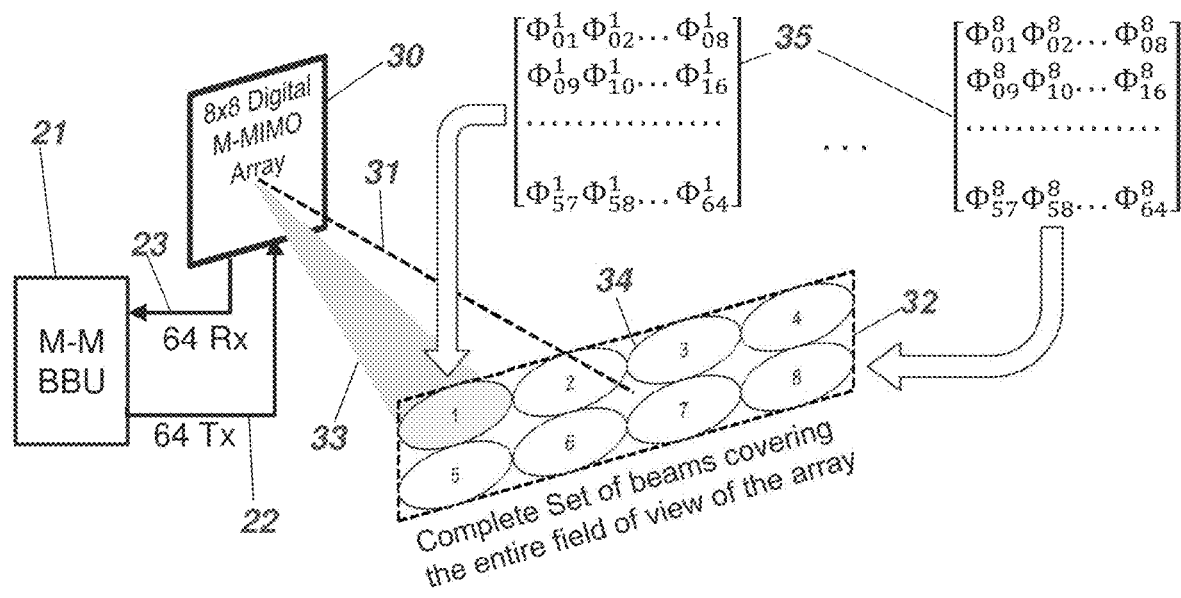
FIG. 1 depicts a simplified schematic diagram of a Digital Massive MIMO system with 64 active antennas placed in an 8×8 planar array and 64 ADC/DAC pairs, using a Massive-MIMO Base-Band Unit (M-M BBU) with 64 antenna ports.

FIG. 1 illustrates a simplified diagram of a typical 8×8 Digital Massive MIMO system. The system comprises a radio array 30 called Digital M-MIMO Array and a processor 21 called Massive MIMO Base-Band Unit (M-M BBU). The radio array 30 comprises 64 active antennas (i.e., each antenna has a power amplifier and a low noise amplifier), 64 Analog-to-Digital Converters (ADCs), 64 Digital-to-Analog Converters (DACs) and additional classical circuitry (e.g. mixers, passive filters, etc.) as required, to form 64 complete radios. These 64 radios communicate with the MM-BBU via 64 digital receive signals (Rx) 23 and 64 digital transmit signals (Tx) 22. For this discussion, the 64 radios are assumed identical in electrical characteristics. This assumption makes the Digital Massive MIMO system discussed here an ideal classical digital phased array oriented along the normal axis 31.

In the Digital Massive MIMO system of FIG. 1 the 64 radios act just as "dumb signal pipes" and do not participate in any Massive MIMO operations. All Massive MIMO operations are executed in the M-M BBU 21 under software control. However, irrespective how complex the M-M BBU algorithms and computations are, ultimately the M-M BBU applies multiple phase rotations and multiple magnitude weights to internal signals, which are then combined linearly and exchanged with the radio array 30 via the 64 Tx digital signals 22 and 64 Rx digital signals 23. These phase rotations and magnitude weights create the transmit and receive radiation patterns of the array. Clearly, the Digital Massive MIMO system can generate complex radiation patterns due to the large number of antenna elements and large number of possible phase and magnitude adjustments. However, it is important to remember that the number of independent streams of information or layers that can be transmitted or received is limited to a small value, which as explained earlier, is equal to or lower than the order of diversity of the system. Here, for the purpose of explaining the concepts herein, we assume without loss of generality that the largest possible number of layers is 8.

An operation mode of the Digital Massive MIMO system is forming narrow beams as shown in FIG. 1. The smallest beam possible is a function of the antenna array aperture according the physical laws of electromagnetic propagation. The larger the aperture the smaller the beam size and vice versa (Fourier transform pair relationship). Let us consider momentarily the smallest beams possible. For the case of the illustrated 8×8 array assumed mounted on a typical cell tower, the field of view 32 of a typical 120-degree sector from the array position on the tower is covered completely by 8 (smallest possible) fixed beams 34 with overlap at the approximately −3 dB contours (i.e. where the beam power drops at half the peak value at the center of the beam). To form these 8 fixed beams, the M-M BBU generates 8 sets of phases 35, shown in FIG. 1 as 8×8 matrices mapping the array. Each matrix element is the phase applied to the respective element in the array to generate the respective beam. The same phase values are valid for Tx beams and Rx beams. In this example the magnitude weights are unity. According to classical phased-array theory, the magnitude is secondary in beam formation, magnitude tapering being used mostly for side lobe suppression (beams formed only by phasing exhibit side lobes, which are small compared to the main beam lobe).

The set of 8 beams illustrated in FIG. 1 are important for explaining the embodiments herein, as will become apparent later. This illustrated set of 8 beams will be called a "Full Covering Set." Notice that the beams in the Full Covering Set are almost orthogonal with just little overlap and collectively cover the field of view of the array, i.e., the range in terms of both azimuth and elevation over which the beams generated by the array can and/or do provide coverage. In fact, at the center of each beam the leakages from the adjacent beams are small enough to be neglected. Therefore, small radiation areas around the center of the beams are mutually orthogonal (no mutual interference). This will be exploited by the implementation examples presented in FIGS. 4 and 5 below.

Another important fact about the 8 beams in the Full Covering Set is that each one can be regarded as being derived from a boresight beam (beam normal to the antenna plane) of the same size, which has been steered to the respective direction. The boresight beam is generated when all phases applied to the antennas in the array are zero (or equal to each other, which is equivalent to zero phases everywhere). Therefore, each set of the 8 sets of phases 35 represents just a direction change of the boresight beam. Each set of phases is represented by the following matrix:

$$\begin{bmatrix} \Phi^i_{01} & \Phi^i_{02} & \ldots & \Phi^i_{08} \\ \Phi^i_{09} & \Phi^i_{10} & \ldots & \Phi^i_{16} \\ \vdots & \vdots & \vdots & \vdots \\ \Phi^i_{57} & \Phi^i_{58} & \ldots & \Phi^i_{64} \end{bmatrix},$$

where i=1,8 and represents the beams identified in FIG. 1. If we add the phases in each of the sets 35 to the phases of the boresight beam element by element (matrix addition) we obtain a direction change of the beam. This simple operation of beam direction changing is quite general, applying to any other radiation pattern of the array, not only to the narrow boresight beam. If we have a general radiation pattern RP generated by the array 10 in FIG. 1 via 64 arbitrary magnitudes and 64 arbitrary phases, simply by adding to these phases the phases of any one of the sets 35, the direction of the radiation pattern RP is changed in the direction of the respective narrow beam 34. This fact will be used later to help us calculate the energy of any radiation pattern propagating in any specific direction.

Hybrid Massive MIMO System with Aperture Connectivity

Figure 2:
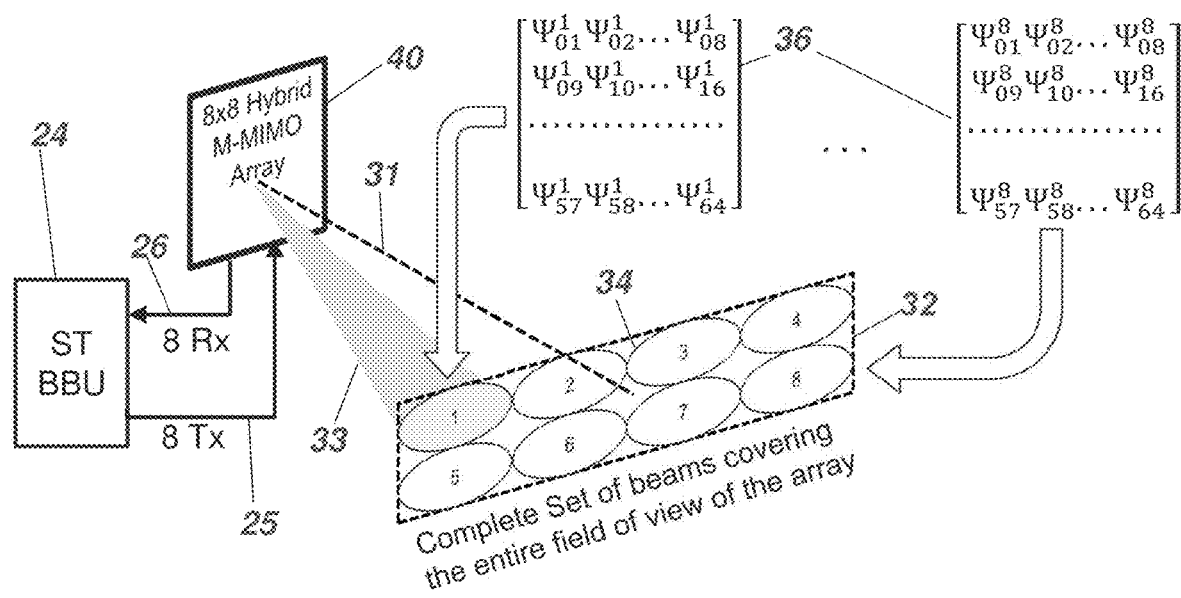
FIG. 2 depicts a simplified schematic diagram of a Hybrid Massive MIMO system with 64 active antennas placed in an 8×8 planar array and 8 ADC/DAC pairs, using a standard Base-Band Unit (ST BBU) with 8 antenna ports.

FIG. 2 illustrates a simplified diagram of an 8×8 Hybrid Massive MIMO system with 8 independent radiation patterns and full aperture connectivity (to be explained shortly). The system comprises an active array 40 called Hybrid M-MIMO Array and a processor 24 called Standard Base-Band Unit (ST BBU). (Further details of an example of such a system can be found in U.S. Pat. No. 8,611,959, entitled "Low Cost, Active Antenna Array Systems," and incorporated herein by reference in its entirety.) The ST BBU may be a regular base band unit as deployed in 4G LTE system with capability of processing up to 8 independent transmit and 8 independent receive data streams. The active array 40 comprises 64 active antennas (i.e., each antenna has a power amplifier and a low noise amplifier), 8×64 receive phase shifters, 8×64 transmit phase shifters, 8×64 receive variable gain amplifiers, 8×64 transmit variable gain amplifiers, 8 ADCs, 8 DACs and additional classical circuitry (e.g. mixers, passive filters, etc.) as required to form 8 complete radios connected to all 64 active antennas. This feature is the full aperture connectivity mentioned earlier. While in general, Hybrid Massive MIMO systems may be designed such that each radio is connected to only a portion of the aperture (also called a sub-array) this embodiment employs full aperture connectivity for all radios.

Every radio of the 8 radios transmits signals through all 64 antennas and receives signals from all 64 antennas. The phase shifters and variable gain amplifiers in the Hybrid Massive MIMO Array are used to control the phase and amplitude of every receive and transmit signals at every active antenna. For this reason, for each radio there is one pair of phase shifters (one for Tx and one for Rx) and one pair of variable gain amplifiers (one for Tx and one for Rx) for each active antenna. The phase/amplitude control is usually digital via a digital bus.

The 8 radios communicate with the ST BBU via 8 digital receive signals (Rx) 26 and 8 digital transmit signals (Tx) 25. For this discussion, the 8 radios and all electrical paths to the antennas are assumed identical in electrical characteristics. This assumption makes the Hybrid Massive MIMO system discussed here an ideal classical analog phased array oriented along the normal axis 31, with 8 independent Tx radiation patterns and 8 independent Rx radiation patterns. These radiation patterns are as flexible as those generated by the Digital Massive MIMO system because both systems have the same number of active antennas and the same possibilities to set phase shifts and magnitude weights. One special set of radiation patterns is the set of narrow beams 34 in FIG. 2, which are identical to the narrow beams in FIG. 1. The phases 36 applied in this case in the analog domain (assuming unity amplitude weights like before) are identical to the phases 35 in FIG. 1 but are labeled with different letters to emphasize the difference between analog and digital methods of generation. They are as follows:

$$\begin{bmatrix} \Psi^i_{01} & \Psi^i_{02} & \cdots & \Psi^i_{08} \\ \Psi^i_{09} & \Psi^i_{10} & \cdots & \Psi^i_{16} \\ \vdots & \vdots & \vdots & \vdots \\ \Psi^i_{57} & \Psi^i_{58} & \cdots & \Psi^i_{64} \end{bmatrix},$$

where i=1,8 and represents the beams shown in FIG. 2. Using the narrow beams 34, the Hybrid Massive MIMO system can generate a Full Covering Set just like the Digital Massive MIMO system.

Emulating a Digital Massive MIMO System with a Hybrid Massive MIMO System

In theory, if the antenna array of the systems in FIGS. 1 and 2 and the propagation environment were such that the order of diversity of the array were larger than 8, the digital system of FIG. 1 would be capable of transmitting and receiving more layers than the hybrid system, which is limited by construction to 8 layers. However, as mentioned earlier, very rarely the order of diversity for a Massive MIMO system is more than 8 especially in the presence of user mobility and interference so in the vast majority of practical cases the hybrid system is as capable as the digital system. The choice of 8 layers for this discussion is not fundamental but rather arbitrary, just to illustrate the point that a much smaller number of radios are sufficient in practice to match the performance of a digital system with a hybrid system. If the maximum order of diversity were 16 for example, a 16-beam hybrid system with 16 radios would be just as capable as a 64-radio digital system. Clearly, the hybrid architecture illustrated in FIG. 2 removes the fundamental hardware/cost/power dissipation inefficiency of the digital architecture.

Given the practical equivalency in performance of the digital and hybrid systems and the higher efficiency of the hybrid design, in practice it would be beneficial to replace the Digital Massive MIMO Array 30 in FIG. 1 with the Hybrid Massive MIMO Array 40 from FIG. 2. In general, the M-M BBU 21 of FIG. 1 is expected to be more advanced and to have more capabilities than the ST BBU of FIG. 2, as it is a newer generation of base band processors. However, the direct interchanging between the Digital Massive MIMO Array 30 and the Hybrid Massive MIMO Array 40 is not possible due to different interfaces to the respective base band unit.

Figure 3:
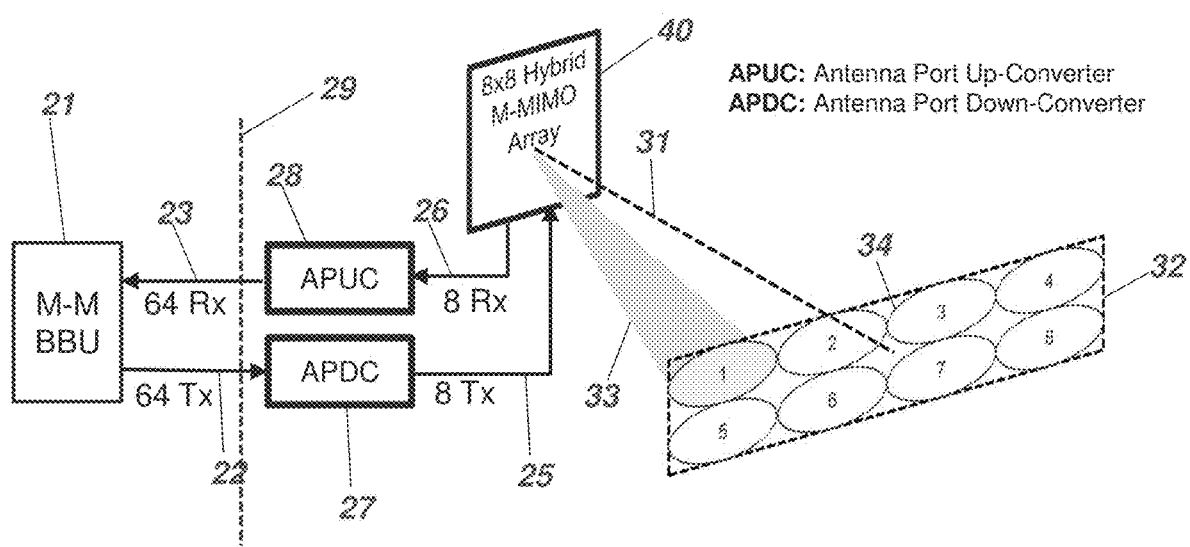
FIG. 3 depicts a simplified schematic diagram of an enhanced Hybrid Massive MIMO system with 64 active antennas placed in an 8×8 planar array and 8 ADC/DAC pairs, using a Massive-MIMO Base-Band Unit (M-M BBU) with 64 antenna ports, being enhanced by Antenna Port Up/Down Converters (APUC & APDC).

FIG. 3 introduces two new blocks called an Antenna Port Down Converter or APDC 27 and an Antenna Port Up Converter or APUC 28, which adapt the interfaces of the digital and hybrid systems. The APDC 27 accepts 64 Tx digital signals as inputs from the M-M BBU and converts them to 8 Tx digital signals to be used by the Hybrid Massive MIMO Array. The APUC 28 accepts 8 Rx digital signals from the Hybrid Massive MIMO Array and converts them to 64 Rx digital signals to be sent to the M-M BBU. The fundamental reason why these conversions are possible is that the number of independent streams of data (layers) contained in all sets of Tx or Rx signals is less or equal to 8. In other words, the 64 Tx/Rx signals interfacing to the M-M BBU only contain 8 independent streams of data and therefore these 64 Tx/Rx signals contain redundant information. Next, we give examples of APDC and APUC functionality that may be achieved in practice.

These two examples are not the only possibilities as many others exist but they are shown here specifically as proof of existence to support the current invention. This demonstrates that a Hybrid Massive MIMO system with full connectivity and RF coherency over the entire aperture, which is enhanced by an appropriate APDC and APUC is equivalent to a Digital Massive MIMO system operating in an environment with order of diversity equal to or less than the number of digitizers (radios) in the Hybrid Massive MIMO system. Therefore, in this scenario the respective Hybrid Massive MIMO system provides all features of the Digital Massive MIMO system including the generation of just as many channel sounding pilots and producing sub-band beamforming.

An Example of Antenna Port Down Converter (APDC)

Figure 4:
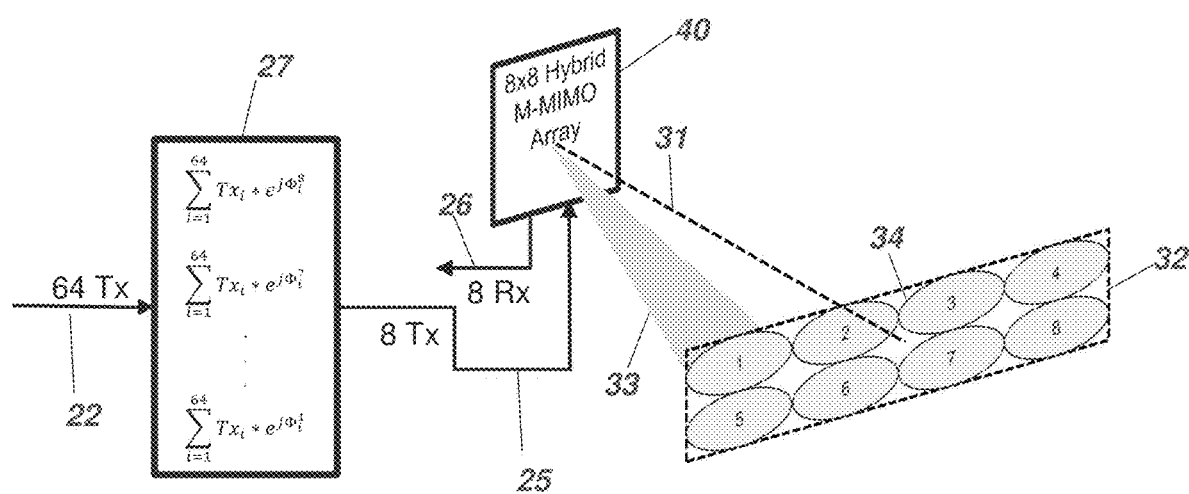
FIG. 4 depicts a simplified schematic diagram of a Hybrid Massive MIMO front end connected to an Antenna Port Down Converter (APDC)

FIG. 4 shows a possible APDC concept. The Hybrid Massive MIMO Array is programmed to simultaneously generate a fixed Full Covering Set of beams as shown in the figure. The APDC block implements the functions shown inside block 27 digitally under control of software or a programmed processing unit. In other words, it performs the following calculations:

$$\sum_{1}^{64} Tx_i * e^{j\Phi_i^n} \text{ for } n = 1,8$$

The signals $Tx_i$ (i=1,64) are the digital signals 22 coming from the M-M BBU and the multiplying phase terms $e^{j\Phi}$ correspond to the phases 35 in FIG. 1. The symbol "j" in all equations in this application represents the unity imaginary number (square root of −1) used in math. The APDC functions in block 27 guarantee that signals fed to each beam in the Full Covering Set produce a radiation value in the center of the respective beam which is identical with the radiation produced by the Digital Massive MIMO system in FIG. 1 in the corresponding beam. Since the radiation in all centers of the beams in the Full Covering Set of the Hybrid Massive MIMO system are forced to be the same as the radiation in corresponding centers of the beams in the corresponding Full Covering Set of the Digital Massive MIMO system, the radiation patterns of the two systems must be similar. This is the same as interpolating a surface from a finite number of points on the surface, which are uniformly spaced. Clearly, the larger the number of points the better the interpolation. In this case, the −3 dB areas around the 8 beam centers have low curvature, therefore the interpolated radiation pattern cannot deviate too far from the original pattern of the Digital Massive MIMO system.

The expressions inside block 27 in FIG. 4 are now explained. Let us focus on the system of FIG. 1 and try to calculate the energy arriving at the center of Beam 1 position (Beam 1 not present!) when the Digital Massive MIMO system generates any radiation pattern (not necessarily narrow beams). A simple examination reveals that the top equation in the block 27 of FIG. 4 gives the value of the energy desired. One way to understand this equation is to imagine that the radiation pattern of the array is steered towards the center of the beam 8 position (no beam 8 present!) and the energy is calculated along the normal axis 31. After this steering, the energy which was at the center of beam 1 before the steering, is now placed on the normal axis 31. The sum of all Tx inputs shifted by the phases for the respective steering gives the desired energy. This signal, equal to the energy at the center of the beam 1 position, is fed to the Hybrid Massive MIMO Array, which places it in the beam 1 position of its own Full Covering Set. The same process takes place for all 8 centers of the Full Covering Set, placing the interpolating points exactly where they need to be to copy the radiation pattern of the Digital Massive MIMO system. It is important to observe that through this process every Tx port signal of the Digital Massive MIMO system is spread in 120-degree directions by the entire radiation of the hybrid system, just like in the case of the original digital system.

An Example of Antenna Port Up Converter (APUC)

Figure 5:
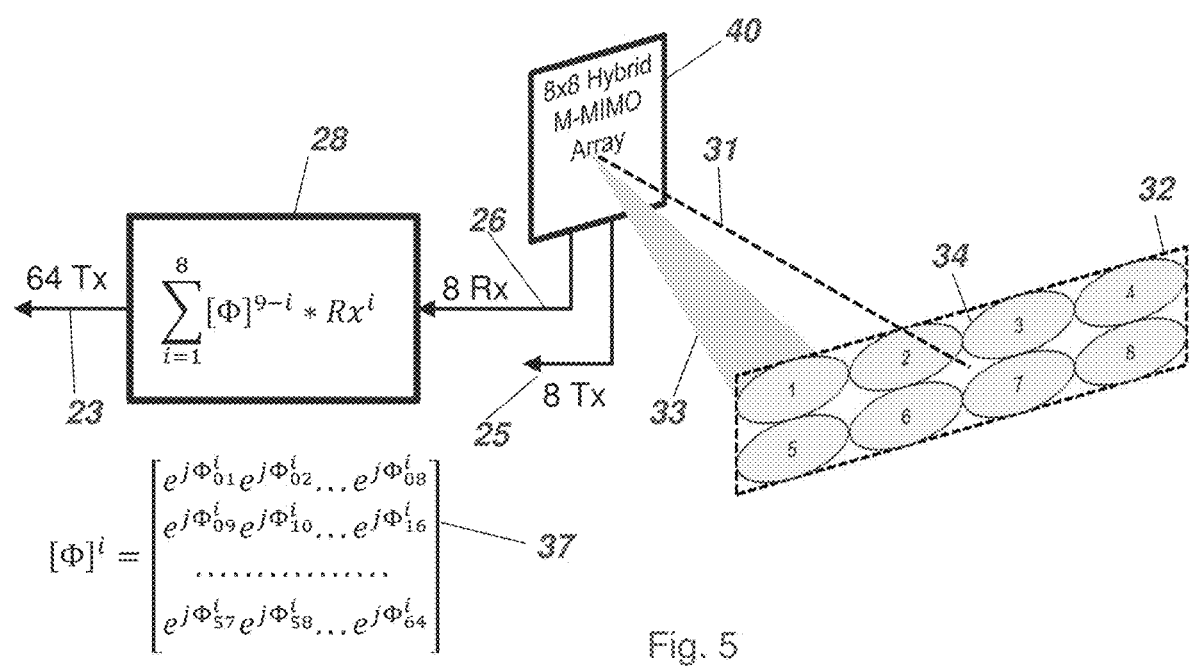
FIG. 5 depicts a simplified schematic diagram of a Hybrid Massive MIMO front end connected to an Antenna Port Up Converter (APUC).

FIG. 5 shows a possible APUC concept. Like in the APDC case, the Hybrid Massive MIMO Array is programmed to simultaneously generate a fixed Full Covering Set of receive beams, as shown in the figure. The APUC block implements the function shown inside block 28 digitally under control of software or a programmed processing unit. In other words, it performs the following computations:

$$\sum_{1}^{8} [\Phi]^{(9-i)} * Rx^i \text{ for } n = 1,8$$

$$[\Phi]^i = \begin{bmatrix} e^{j\Phi_{01}^i} & e^{j\Phi_{02}^i} & \cdots & e^{j\Phi_{08}^i} \\ e^{j\Phi_{09}^i} & e^{j\Phi_{10}^i} & \cdots & e^{j\Phi_{16}^i} \\ \vdots & \vdots & \vdots & \vdots \\ e^{j\Phi_{57}^i} & e^{j\Phi_{58}^i} & \cdots & e^{j\Phi_{64}^i} \end{bmatrix}$$

The matrices 15, which are used in the calculations inside block 28 are the phase matrices necessary to program the Digital Massive MIMO system of FIG. 1 to generate the Full Covering Set. The signals $Rx^j$ (J=1,8) are the received signals from the Hybrid Massive MIMO Array. The function inside block 28 guarantees that signals coming through the center of each beam in the Full Covering Set of the Hybrid Massive MIMO Array are directed to the M-M BBU via the 64 Rx digital signals in identical fashion as they would come through the Digital Massive MIMO Array 30 in FIG. 1. Since the incoming radiation from all centers of the beams in the Full Covering Set of the Hybrid Massive MIMO system are forced to be the same as the radiation from corresponding centers of the beams in the corresponding Full Covering Set of the Digital Massive MIMO system, the Rx radiation patterns of the two systems must be very similar. Like in the case of the APDC, this is to the same as interpolating a surface from a finite number of points on the surface, which are uniformly spaced. In this case, the −3 dB areas around the 8 beam centers have low curvature, therefore the interpolation radiation pattern cannot deviate too far from the original pattern of the Digital Massive MIMO system.

The expression inside block 28 in FIG. 5 is now explained. Let us focus on the system of FIG. 1 and try to calculate the energy arriving from the center of Beam 1 position (Beam 1 not present!) when the Digital Massive MIMO system receives any radiation pattern (not necessarily narrow beams). A simple examination reveals that the first term of the equation in the block 28 of FIG. 5 gives the value of the energy desired. One way to understand this equation is to imagine that the radiation pattern of the array is steered towards the center of the beam 8 position (no beam 8 present!) and the energy is calculated along the normal axis 31. This steering is done by multiplying by matrices 37 in FIG. 5, corresponding to the phases 35 in FIG. 1. The sum of all Rx inputs shifted by the phases for the respective steering gives the desired energy. The same process takes place for all 8 centers of the Full Covering Set, placing the interpolating points exactly where they need to be to copy the Rx radiation pattern of the Digital Massive MIMO system.

Figure 6:
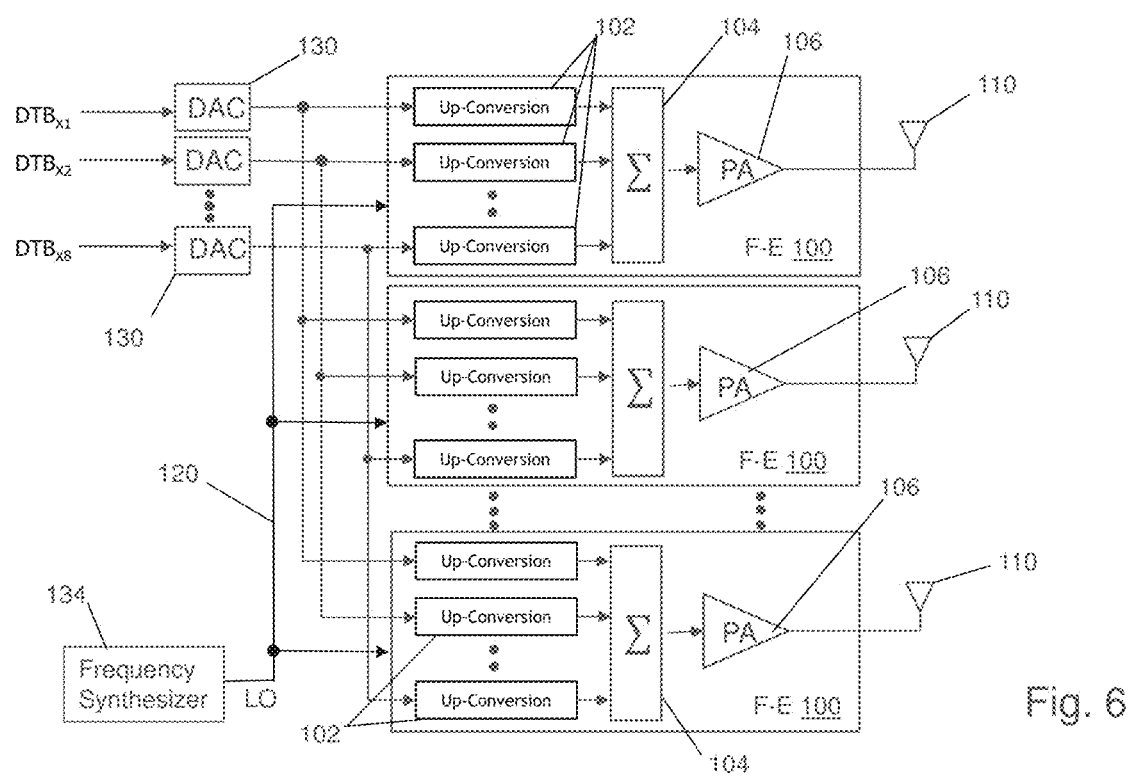
FIG. 6 depicts the internal structure of the transmit side of the Hybrid Massive MIMO System.
Figure 7:
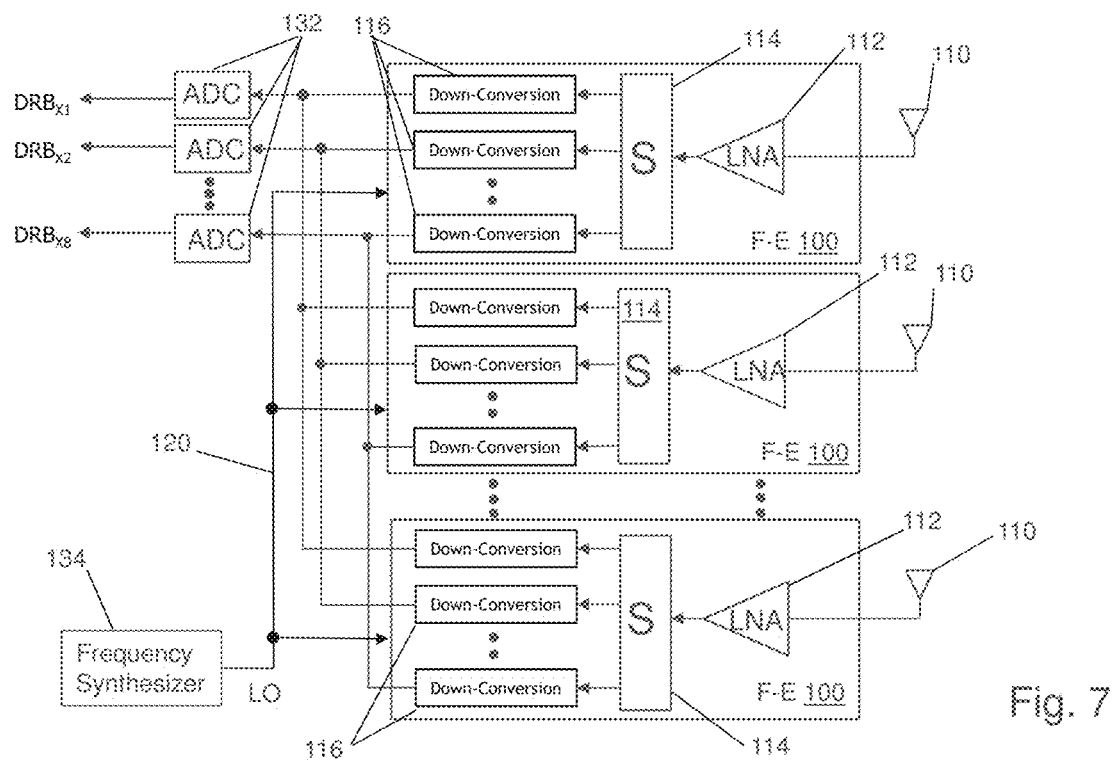
FIG. 7 depicts the internal structure of the receiver side of the Hybrid Massive MIMO System.

FIGS. 6 and 7 show block diagrams of a simplified representation of the circuitry that connects to antenna elements 110 in the multi-element antenna array. For each antenna element 110, there is a front-end module (or Tx/Rx module) 100 connected to that antenna element 110. The front-end module has transmitter side circuitry (as shown in FIG. 6) and receiver side circuitry (as shown in FIG. 7). For the transmitter side, the front-end module 100 includes N up-conversion modules 102, a combiner circuit 104, and a power amplifier (PA) 106. (In this example, N=8, which is the number of digital signal streams coming from the APDC 27—see FIG. 3.) For the receiver side, the front-end module 100 includes a low noise amplifier (LNA) 112, a splitter 114, and N down-conversion modules 116. The front-end module 100 also includes a duplexer circuit (not shown) that couples the drive signal from the PA 106 on the transmitter side to the antenna element 110 and couples a received signal from the antenna element 110 to the LNA 112 on the receiver side. The input of each up-conversion module 102 receives a different beam transmit signal stream from a corresponding different on of a set of 8 digital-to-analog converters (DAC) 130 provided by the APDC. And each down-conversion module 116 outputs a different beam received signal stream $Br_1 \ldots Br_n$ to a corresponding different one of a set of 8 analog-to-digital converters (ADC) 132. The outputs of the ADCs 132 pass to the APUC 28 (see FIG. 3). Each beam transmit signal stream is mapped to a different beam that is generated by the active antenna array system and each received beam signal stream corresponds to the signal received by a different receive beam formed by the active antenna array.

As indicated, there is also a frequency synthesizer 134 supplying a local oscillator (LO) signal to an LO distribution network 120 for distributing a coherent or phase synchronized LO signal to all of the up-conversion modules 102 and all of the down-conversion modules 116.

Figures 8A, 8B:
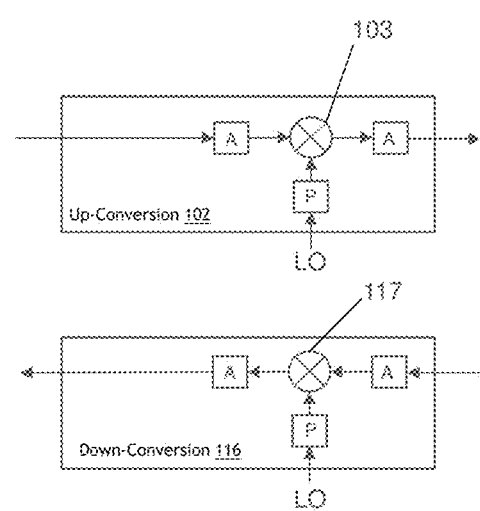
FIG. 8A depicts the internal structure of an exemplary up-conversion module.
FIG. 8B depicts the internal structure of an exemplary down-conversion module.

As shown in FIG. 8A, each up-conversion module 102 includes a mixer 103 and various amplitude and phase setting circuits identified by A and P, respectively. The LO signal and the analog signal from the DAC are both provided to the mixer 103 which up-converts the signal from the DAC to an RF transmit signal stream that is provided to the power amplifier 106. Similarly, each down-conversion module 116 also includes a mixer 117 and various amplitude and phase setting circuits similarly identified by A and P, respectively. The mixer 117 in the down-conversion module 116 multiplies the LO signal provided by the LO distribution network 120 and the received RF signal stream from the low noise amplifier 112 that is coupled to the antenna element 110 to generate a down-converted analog received signal stream. The down-converted analog received signal stream is provided to the corresponding ADC for conversion to a digital signal which is sent to the M-M BBU.

The amplitude and phase setting circuits A and P are used for changing the relative phase or amplitude of individual antenna signals to thereby establish the size, direction, and intensity of the transmit and receive beam patterns that are generated by the antenna array. (Note: In a phased array antenna system, a transmit beam is a radiation pattern that is generated by the antenna array and that can be measured in front of the antenna array. In contrast, a receive beam is not a radiation pattern but rather is a pattern of antenna sensitivity. Both are generally referred to as beams.) The amplitude setting circuit is basically equivalent to a variable gain amplifier in which the ratio of the output signal amplitude to the input signal amplitude is programmable and is set by electronic control. The phase setting circuit is capable of shifting the input signal in phase (or time) under electronic control. These amplitude and phase setting circuits are controlled by digital control signals supplied by a separate control processor (not shown).

The depicted topologies of the amplitude setting and phase setting circuits shown in FIGS. 8A and 8B are simplified examples. There are other configurations for independently controlling the amplitude and phase values of the individual antenna signals. The number and placement of the amplitude and phase setting circuits can vary from what is illustrated in FIGS. 8A and 8B. In addition, there are other components which are present in the up-conversion and down-conversion modules but which are not shown in the figures as they are of secondary importance and are well known to persons skilled in the art. These might include, for example, channel filters, RF filters, automatic gain controls, etc. In addition, it should be understood that there could be multiple mixers in the up-conversion module to shift the frequency of the signal in stages, e.g. from the frequency of the signal output by the DAC to IF (Intermediate Frequency) and then from IF to RF (Radio Frequency) for transmission. The same is true for the down-conversion modules.

In embodiments in which various functions are implemented by a processor, the processor could be one or more processor or microprocessors, one or more FPGA's or other programmable devices and the programming code or instructions may be stored in computer-readable non-volatile storage media (e.g. EEPROM, a magnetic disk, RAM, etc.).

Other embodiments are within the following claims.

What is claimed is:

1. A signal transmission method comprising:
receiving from a base band unit M·N digital transmit signal streams, each digital transmit signal stream representing a transmit signal for a different corresponding antenna element of an M×N array of antenna elements;
generating P digital transmit-beam signal streams from the M·N digital transmit signal streams, wherein each of the P digital transmit-beam signal streams is a corresponding linear combination of the M·N digital transmit signal streams;
within an R×T Hybrid Massive MIMO system having R·T antenna elements, by applying appropriate phase shifts in an analog domain, causing the R×T Hybrid Massive MIMO system to simultaneously generate a set of P independent, differently directed transmit beams; and
within the R×T Hybrid Massive MIMO system, mapping each of the P digital transmit beam signal streams to a corresponding different one of the P independent, differently directed transmit beams of the set of P independent, differently directed transmit beams, wherein M, N, P, R and T are integers, wherein $R \cdot T \geq M \cdot N$, and wherein $P < M \cdot N$.

2. The signal transmission method of claim 1, wherein $R \cdot T = M \cdot N$.

3. The signal transmission method of claim 1, wherein P is much less than M·N.

4. The signal transmission method of claim 1, wherein each of the P digital transmit-beam signal streams is a corresponding different linear combination of the M·N digital transmit signal streams.

5. The signal transmission method of claim 4, wherein each of the P digital transmit-beam signal streams is a corresponding different linear combination of all of the M·N digital transmit signal streams.

6. The signal transmission method of claim 1, wherein the P independent, differently directed transmit beams of the set of P independent, differently directed transmit beams are narrow beams.

7. The signal transmission method of claim 1, wherein the R×T Hybrid Massive MIMO system has a field of view and wherein the P independent, differently directed transmit beams of the set of P independent, differently directed transmit beams are arranged to form a full aperture covering set for the field of view.

8. The signal transmission method of claim 1, wherein the linear combinations used to form the P digital transmit-beam signal streams are defined so as to cause the antenna system to operate as a Digital Massive MIMO system.

9. The signal transmission method of claim 1, wherein R=T=M=N=P=8.

10. The signal transmission method of claim 1, wherein all of the R·T antenna elements of the R×T Hybrid Massive MIMO system are used to generate each of the P independent, differently directed transmit beams of the set of P independent, differently directed transmit beams.

11. A signal receiving method comprising:
within an R×T Hybrid Massive MIMO system having R·T antenna elements, by applying appropriate phase shifts in the analog domain, causing the R×T Hybrid Massive MIMO system to simultaneously generate a set of P independent, differently directed receive beams;
simultaneously receiving P received beam signal streams, each received beam signal stream of the P received beam signal streams received over a different corresponding one of the P independent, differently directed receive beams of the set of P independent, differently directed receive beams;
generating M·N digital, up-converted signal streams from the P received beam signal streams, wherein each of the M·N digital, up-converted signal streams is a corresponding different linear combination of the P received beam signal streams; and
sending the M·N digital, up-converted signal streams to a base band unit, wherein M, N, P, R and T are integers, wherein R·T≧M·N, and wherein P<M·N.

12. The signal receiving method of claim 11, wherein R·T=M·N.

13. The signal receiving method of claim 11, wherein P is much less than M·N.

14. The signal receiving method of claim 11, wherein each of the M·N digital up-converted transmit signal streams is a corresponding different linear combination of the P received beam signal streams.

15. The signal receiving method of claim 14, wherein each of the M·N digital up-converted transmit signal streams is a corresponding different linear combination of all of the P received beam signal streams.

16. The signal receiving method of claim 11, wherein the P independent, differently directed receive beams of the set of P independent, differently directed receive beams are narrow beams.

17. The signal receiving method of claim 11, wherein the R×T Hybrid Massive MIMO system has a field of view and wherein the P independent, differently directed receive beams of the set of P independent, differently directed receive beams are arranged to form a full aperture covering set for the field of view.

18. The signal receiving method of claim 11, wherein the linear combinations used to form the M·N digital, up-converted signal streams are defined so as to cause the antenna system to operate as a Digital Massive MIMO system.

19. The signal receiving method of claim 11, wherein R=T=M=N=P=8.

20. The signal receiving method of claim 11, wherein all of the R·T antenna elements of the R×T Hybrid Massive MIMO system are used to generate each of the P independent, differently directed receive beams of the set of P independent, differently receive transmit beams.

21. An antenna system comprising:
a down converter module having M·N inputs for receiving M·N digital transmit signal streams, each digital transmit signal stream representing a transmit signal for a different corresponding antenna element of an M×N array of antenna elements, said down converter module programmed to generate P digital transmit-beam signal streams from the M·N digital transmit signal streams, wherein each of the P digital transmit-beam signal streams is a corresponding linear combination of the M·N digital transmit signal streams; and
an R×T Hybrid Massive MIMO system having R·T antenna elements, said R×T Hybrid Massive MIMO system configured to apply appropriate phase shifts in an analog domain that cause the R×T Hybrid Massive MIMO system to simultaneously generate a set of P independent, differently directed transmit beams and further configured to map each of the P digital transmit beam signal streams to a corresponding different one of the P independent, differently directed transmit beams of the set of P independent, differently directed transmit beams, wherein M, N, P, R and T are integers, wherein R·T≧M·N, and wherein P<M·N.

22. The antenna system of claim 21, wherein each of the P digital transmit-beam signal streams is a corresponding different linear combination of all of the M·N digital transmit signal streams.

23. The antenna system of claim 21, wherein the R×T Hybrid Massive MIMO system has a field of view and wherein the P independent, differently directed transmit beams of the set of P independent, differently directed transmit beams are arranged to form a full aperture covering set for the field of view.

24. The antenna system of claim 21, wherein the linear combinations used to form the P digital transmit-beam signal streams are defined so as to cause the antenna system to operate as a Digital Massive MIMO system.

25. The antenna system of claim 21, wherein the R×T Hybrid Massive MIMO system provides full aperture connectivity for each of the P independent, differently directed transmit beams of the set of P independent, differently directed transmit beams.

26. An antenna system comprising:
an R×T Hybrid Massive MIMO system having R·T antenna elements, said R×T Hybrid Massive MIMO system configured to apply appropriate phase shifts in the analog domain that cause the R×T Hybrid Massive MIMO system to simultaneously generate P independent, differently directed receive beams for receiving P received beam signal streams, each received beam signal stream of the P received beam signal streams received over a different corresponding one of the P differently directed receive beams;
an up-converter module having P inputs for receiving the P received beam signal streams from the R×T Hybrid Massive MIMO system, said up-converter module programmed to generate M·N digital, up-converted signal streams from the P received beam signal streams, wherein each of the M·N digital up-converted signal streams is a corresponding different linear combination of the P received beam signal streams and output the M·N digital up-converted signal streams for a base band unit, wherein M, N, P, R and T are integers, wherein R·T≧M·N, and wherein P<M·N.

27. The antenna system of claim 26, wherein each of the M·N digital up-converted transmit signal streams is a corresponding different linear combination of all of the P received beam signal streams.

28. The antenna system of claim 26, wherein the R×T Hybrid Massive MIMO system has a field of view and wherein the P independent, differently directed receive beams of the set of P independent, differently directed receive beams are arranged to form a full aperture covering set for the field of view.

29. The antenna system of claim 26, wherein the linear combinations used to form the M·N digital, up-converted signal streams are defined so as to cause the antenna system to operate as a Digital Massive MIMO system.

30. The antenna system of claim 26, wherein the R×T Hybrid Massive MIMO system provides full aperture connectivity for each of the P independent, differently directed transmit beams of the set of P independent, differently directed transmit beams.

\* \* \* \* \*